United States Patent [19]
Warren et al.

[11] Patent Number: 5,328,606
[45] Date of Patent: Jul. 12, 1994

[54] SPIN ON OIL FILTER WITH EXTENDIBLE HANDLE

[76] Inventors: Travis Warren, Rte. 1, Box 380, Hattiville, Ark. 72063; John R. Byrum, Rte. 1, Box 273, Dover, Ark. 72837; Thomas A. Ramsey, Rte. 1, Box 380, Hattiville, Ark. 72063

[21] Appl. No.: 44,017

[22] Filed: Apr. 8, 1993

[51] Int. Cl.$^5$ .............................................. B01D 27/08
[52] U.S. Cl. ............................ 210/238; 210/DIG. 17
[58] Field of Search ................ 210/238, 470, DIG. 17

[56] References Cited

U.S. PATENT DOCUMENTS 5,000,847  3/1991  Huang ................................ 210/238

FOREIGN PATENT DOCUMENTS 1532437  7/1968  France ......................... 210/DIG. 17

Primary Examiner—Matthew O. Savage
Attorney, Agent, or Firm—Stephen D. Carver

[57] ABSTRACT

A spin-on oil filter comprising a generally tubular body housing a filtering element and a retractable, external handle that can be manually gripped and twisted for filter installation and removal. The handle comprises a pair of spaced apart, elongated legs and an integral grip extending between the legs for grasping by a user. A pair of elongated, spaced apart sleeves diametrically extending from the body frictionally slidably captivate the legs. A stop is disposed on the distal end of each leg to limit displacement of the handle. The arched legs yieldably maintain said handle in either a semipermanent retracted state or a semipermanent deployed state, as they snappingly frictionally react with the surrounding sleeves. The distal and top portions of the legs are arched more that the intermediate portion, so that the handle may relatively easily slide between the semipermanent retracted or deployed states. The preferred embodiment employs round bar stock to form the handle. Its grip is bent in a finger receptive serpentine shape. The sleeves for the preferred embodiment are generally tubular. The handle in the alternative embodiment is a flat, low-profile band flushly nested against the body when retracted. The sleeves are replaced by diametrically opposed, relatively flat sheathes frictionally slidably captivating the legs.

12 Claims, 3 Drawing Sheets

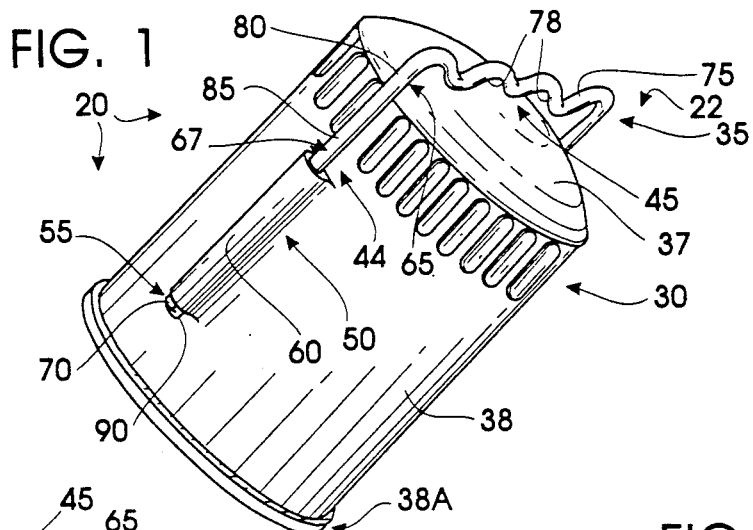
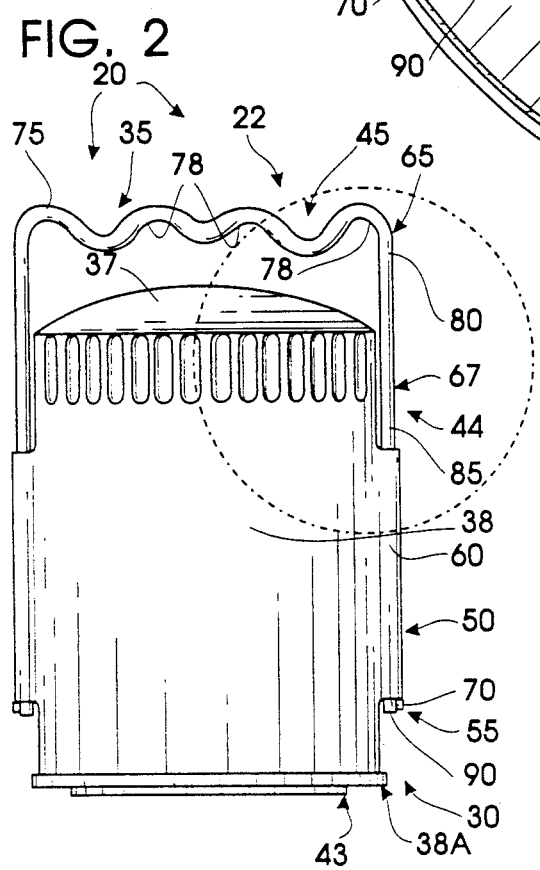
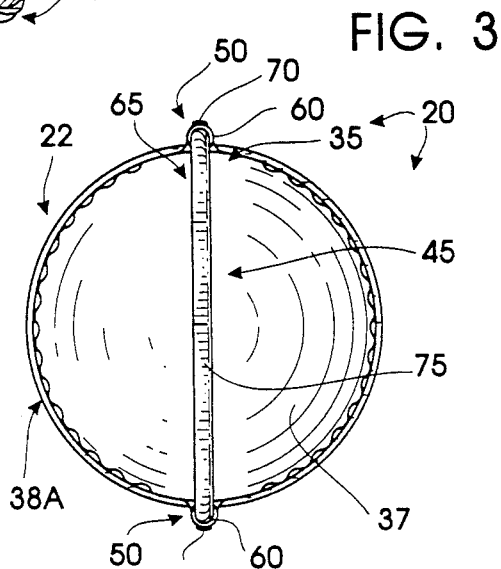
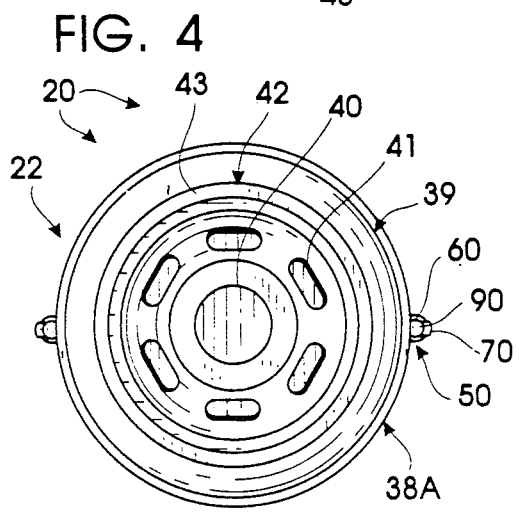
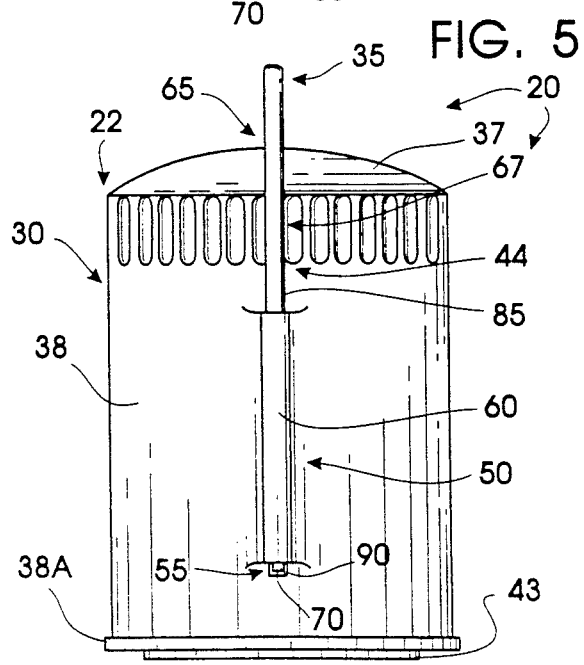

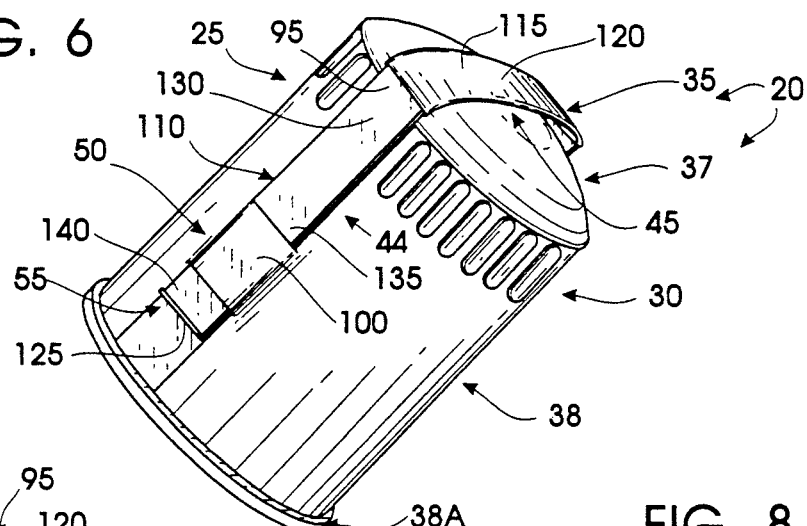
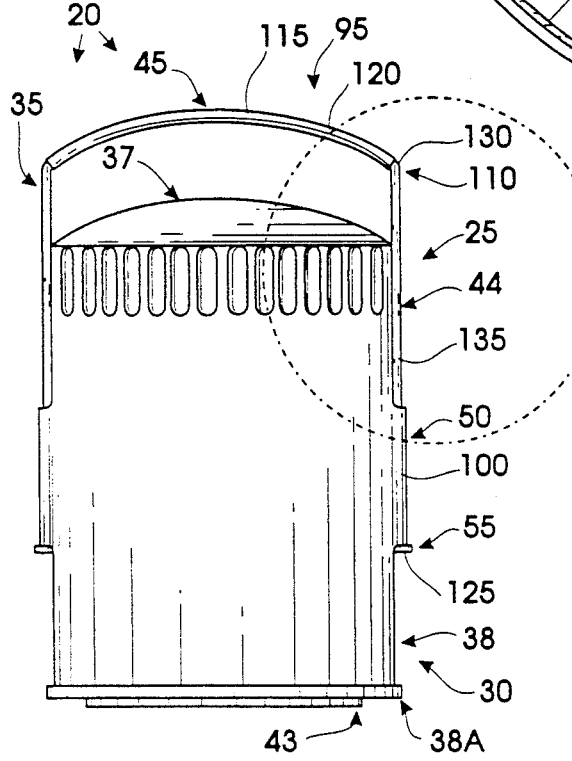
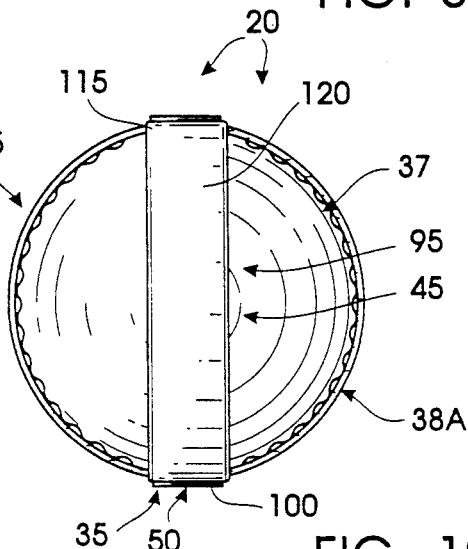
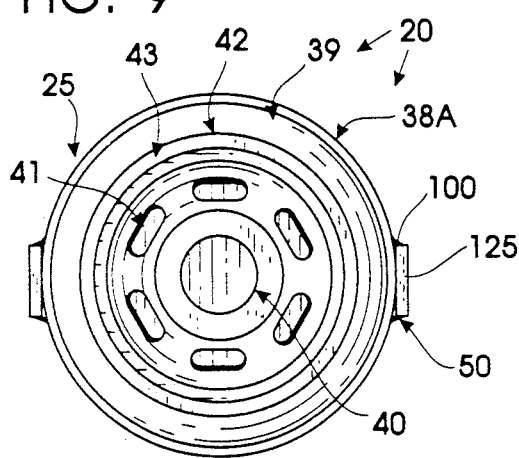
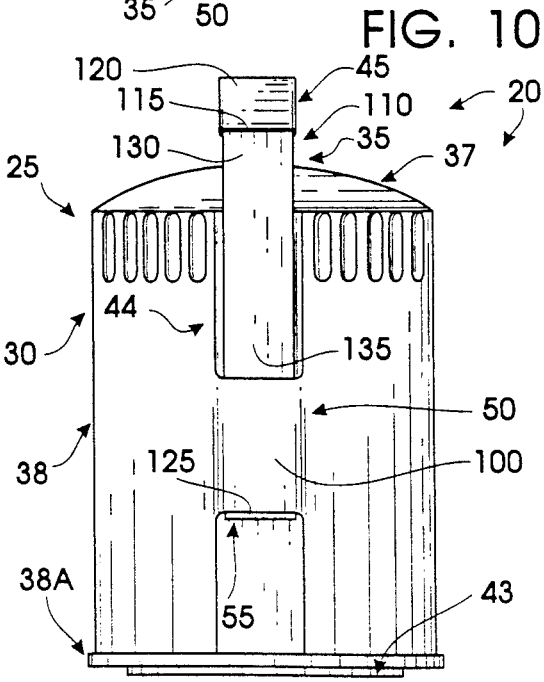

SPIN ON OIL FILTER WITH EXTENDIBLE HANDLE

BACKGROUND OF THE INVENTION

The present invention broadly relates to cartridge type filters. Particularly the present invention is a spin on internal combustion engine oil filter with an extendible handle. Art pertinent to the present invention is found in U.S. Patent Class 210, subclasses 232, 237 and 238.

Generally, an oil filter has a tubular body which houses the filter element. Motor oil enters the filter through a central orifice and after being filtered exits through outlet orifices. These orifices are defined in a plate spanning the bottom of the filter. A peripheral gasket is disposed in a groove in the plate. The gasket mates with a flange associated with an engine to provide a fluid seal.

As those familiar with the art will appreciate, the removal of a used cartridge oil filter from an internal combustion engine is often a bothersome procedure. When installed, an oil filter is only spun on until it is "hand tight." Due to the construction of the oil filters, and the necessity to prevent leaks, they must be properly gasketed. After several engine heating and cooling cycles oil filters can tighten and the gasket can harden. In order to remove an old oil filter, tools such as a filter wrench which provide a contractible loop must be employed to grip and remove the filter. In many cases clearance will not permit use of such a wrench. Oftentimes it is necessary to resort to cruder methods to remove the filter. For example, a screw driver or pry bar may be driven through the body of the filter to provide a lever to remove the filter. Many attempts have been made to alleviate the problems associated with oil filter removal and clearance around the oil filter. Some of these include accessories or tools to be used with an oil filter.

Krauss, U.S. Pat. No. 4,865,727, discloses an oil filter package for removing an old oil filter.

A funnel that doubles as an oil filter removal tool is disclosed in Holman, U.S. Pat. No. 4,867,017.

Another device intended to be attached to an oil filter is disclosed in Sweeney, U.S. Pat. No. 4,964,330. This device provides a plurality of wings on the head of the filter to facilitate the use of a pry bar or gripping by an individual.

Several inventions relate to devices intended to be wrapped around the oil filter and then pulled to spin the filter. Robins, U.S. Pat. No. 4,860,617, discloses a strap wrench that may be wrapped around the filter to facilitate removal. Bundidge, U.S. Pat. No. 4,167,776, discloses a wrapping that is intended to be disposed on an oil filter prior to installation. Pulling these wrappings is intended to rotate the filter facilitating both installation and removal.

Several patents disclose structures disposed on the filter to facilitate removal. Humbert, U.S. Pat. No. 3,473,666, discloses an oil filter with a hexagonal head on its top intended to receive a wrench. Furthermore, the interior of the head defines a star shaped orifice intended to receive a special tool in conjunction with the hex head.

Bosses extending from oil filters are also known in the art. A simple ridge disposed on the top of an oil filter is disclosed in Huang, U.S. Pat. No. 5,000,847. Wings extending from the sides of an oil filter are disclosed in Kemper, U.S. Pat. No. 5,024,760. Atkins, U.S. Pat. No. 4,364,829, discloses an oil filter attachment that mates with ears disposed around the top of an oil filter to aid in removal.

Foust, U.S. Pat. Nos. 4,851,117 and 5,076,918, disclose quick change oil filters. Each of these filters employ a flip-up lever associated with a central elongated shaft coaxially mounted in the filter. The distal end of the shaft is threaded to receive the oil filter flange of an internal combustion engine. The lever is rotated to tighten the filter down onto the flange. Removal is also accomplished by rotation of the lever.

The prior art fails to disclose a straightforward structure which could be integrated into present oil filter designs to facilitate installation and removal. As mentioned above, most close tolerance situations will not allow use of a filter wrench due to the inability of the handle of the wrench to swing. However, most installations provide "head clearance" for the oil filter. In other words, room is provided directly above the oil filter to allow removal and insertion of the filter into the area it is to occupy.

Therefore, it is desirous to provide an oil filter that takes advantage of this head room to facilitate installation and removal. However, it is additionally desirable that any handle associated with the oil filter be of a convertible nature. If the handle can be retracted it would be easier to initially insert the oil filter into the area to be occupied. Additionally, an extensible handle must be securable in a retracted position after installation. This relieves the possibility of noise resulting from engine vibration and to prevent interference with other components. Such a filter would need to aid a user's grip on the handle. This would be necessary since a user's hands will often be oily or the area around the oil filter will be greasy making it difficult to grip the filter or handle. Furthermore, it would be quit helpful if the handle is designed in such a manner that it can be used as an anchor point and fulcrum for a lever to aid in the removal of a stuck oil filter.

SUMMARY OF THE INVENTION

Our Spin On Oil Filter with an Extendible Handle uses the head room associated with an oil filter to facilitate installation and removal. The handle associated with the oil filter is convertible. The handle can be retracted to ease insertion of the oil filter into the area it is to occupied. The handle semi-permanently locks in either the extended or retracted position. By locking in the extended position installation or removal is facilitated. By locking in the retracted position after installation the possibility of vibrational noise is 11 reduced as is the possibility of the handle interfering with other engine components. Both embodiments of the present invention provide a grip that aids the user in grasping the handle.

Our handle is integral and is comprised of spaced apart legs and a grip extending between the legs. Diametrically opposed sleeves extend from the filter body to receive the legs. The legs terminate in stops that limit extension of the handle. The legs are slightly bent near the proximal and distal ends to semi-permanently lock the handle in an extended or retracted position.

The preferred embodiment has a handle constructed from round bar stock. The sleeves are tubular in shape to receive the handle's legs. The grip has a serpentine shape defining finger receptive reliefs to facilitate use by an individual with oily hands. A tab on the distal end of each leg provides the stop necessary to limit extension of the handle.

The alternative embodiment has a "band" handle. Diametrically opposed sheaves extending from the filter body receive the relatively flat alternative handle's legs. The relatively flat sheaves provide maximum clearance for the filter. The grip is also low profile providing maximum clearance to insert the filter into the area it is to occupy. A user's grasp is aided by a resilient covering on the grip. Additionally, the covering elevates the danger presented by sharp edges. The stops are upturned lips in the distal end of the flat legs.

The handle of the filter is deployed by grasping the grip and pulling. Travel is halted by the stops contacting the sleeves. The handle semi permanently locks in place fully extended. To retract the handle one need only push it toward the top of the filter. The handle also semi-permanently locks in the retracted position.

Therefore, a primary object of the present invention is to provide a Spin On Oil Filter with an Extendible Handle.

An object of the present invention is to provide an oil filter that makes use of head room to ease installation and removal.

Another object of the present invention is to provide an oil filter that has a convertible handle.

A related object of the present invention is to provide an oil filter in which the handle can be retracted to aid inserting the filter into the proper position.

An object of the present invention is to provide an oil filter with a handle that semi-permanently locks in either the extended or retracted position.

A related object is to provide an oil filter in which a handle that is snappingly retained in an extended or retracted position.

A further related object is to provide an oil filter with an extensible handle in which the handle is not a source of vibrational noise.

Another related object is to provide an oil filter with an extensible handle in which the handle does not interfere with other engine components.

Another primary object is to provide an oil filter that has a grip that aids the user in grasping the filter for installation and removal.

A related object is to provide an oil filter which has no sharp edges.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is a side top isometric view of the preferred embodiment of our Spin On Oil Filter with an Extendible Handle, showing the handle fully retracted;

FIG. 2 is a front elevational view of the preferred embodiment of our filter with the handle fully extended;

FIG. 3 is top plan view of the preferred embodiment;

FIG. 4 is bottom plan view of the preferred embodiment;

FIG. 5 is a side elevational view of the preferred embodiment with the handle fully extended;

FIG. 6 is a side top isometric view of the alternative embodiment of our Spin On Oil Filter with an Extendible Handle with the handle fully retracted;

FIG. 7 is a front elevational view of the alternative embodiment with the handle fully extended;

FIG. 8 is top plan view of the alternative embodiment;

FIG. 9 is bottom plan view of the alternative embodiment;

FIG. 10 is a side elevational view of the alternative embodiment with the handle fully extended.

DETAILED DESCRIPTION

Figure 11:
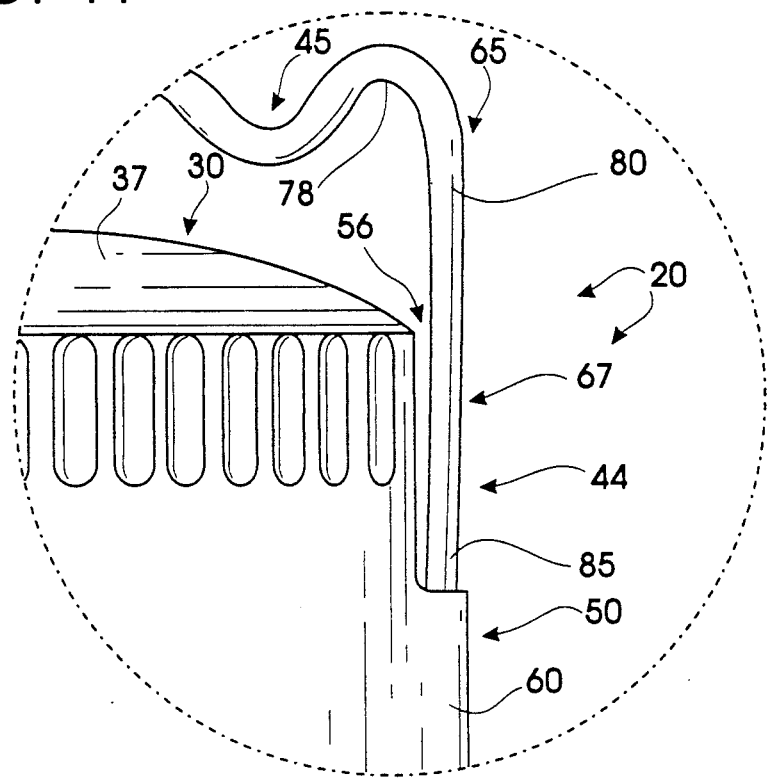
FIG. 11 is an enlarged portion of FIG. 2 as indicated by the dot-dash circle in FIG. 2, illustrating the arc in the legs in the preferred embodiment; and, FIG. 12 is an enlarged portion of FIG. 7 indicated by the dot-dash circle in FIG. 7, illustrating the arc in the legs in the alternative embodiment.

With reference now to the accompanying drawings our Spin On Oil Filter with an Extendible Handle is broadly designated by the reference numeral 20. The preferred embodiment is designated by the reference numeral 22 (FIGS. 1-5), and an alternative embodiment is designated by the reference numeral 25 (FIGS. 6-10). Generally, my oil filter has a tubular body 30 which houses a filter element. A fluid such as motor oil is circulated through the body 30 establishing a fluid flow path through the element. Our oil filter 20 has a retractable, external handle 35 to facilitate installation and removal.

The body 30 is generally tubular with a closed top 37 and an integral wall 38. A bottom plate 39 is secured to the wall 38 around its lower periphery 38A. The bottom plate 39 defines a central threaded orifice 40 and outer outlet orifices 41. Oil moves into the filter body 30 through the central orifice 40 and out through the outlet orifices 41. A peripheral groove 42 receives a gasket 43 to seal the filter to an oil filter flange associated with an engine.

Generally, the integral handle 35 comprises spaced apart legs 44 and a grip 45 extending between the legs 44. The legs 44 are slidably received by diametrically opposed sleeves 50 extending from the body 30. Stops 55 are defined on the ends of the legs 44 to limit displacement of the handle 35. The legs 44 are configured to yieldably maintained the handle 35 in either a semi-permanently contracted state or a semi-permanently deployed state. In order to do so the legs 44 are slightly bent in an arc 56 (FIG. 11).

The preferred embodiment 22 employs generally tubular sleeves 60 extending from the body 30. The retractable handle 65 of the preferred embodiment 22 is formed from round bar stock. The grip 75 is bent to form a finger receptive serpentine shape. The reliefs 78 formed by the grip 75 allows one to comfortably grasp the handle 65. Hence, use by an individual with oily hands is easier. The legs 67 of the preferred embodiment have a proximal portion 80 integral with the grip, an intermediate portion 85 and a distal portion 90. The stop 55 is defined in the lower portion 90 by a tab 70. The distal and proximal portions 90, 80 of the legs are arced with a tighter radius than the intermediate portion 85. The arc 56 facilitates semi-permanent jamming of the handle 65 in a fully deployed position and a fully retracted position. Furthermore, having a shallower arc in the intermediate portion 85 facilitates free movement between the retracted and extended position.

Turning to FIGS. 6 through 10, the alternative embodiment 25 of the present invention is illustrated employing a "band" handle 95. The body 30 of the alternative embodiment has a pair of diametrically opposed sheaves 100 extending from its outer surface. These sheaves 100 are as flat as possible to provide maximum clearance around of the sides of the oil filter 20. The handle 65 has a pair of flat spaced apart elongated legs 110. A flat low profile grip 115 extends between the legs 110. The grip 115 is flushly nested against the top 37 of the oil filter body 30 when retracted. A resilient covering 120 is disposed on the grip 115. The covering 120 facilitates gripping and elevates the danger of sharp edges.

The legs 110 have a proximal portion 130 integral with the grip 115, an intermediate portion 135 and a distal portion 140 with a slightly upturned lip 125 defining the stop 55. The legs 110 are slightly arced to facilitate snap deployment of the handle. The proximal and distal portions 130, 140 of the leg are arced to facilitate wedging the legs 110 in the sheathes 100 when deployed in either the retracted or extended position. The intermediate portion 135 of the leg 110 is less arched to facilitate intermediate movement of the handle.

Figure 12:
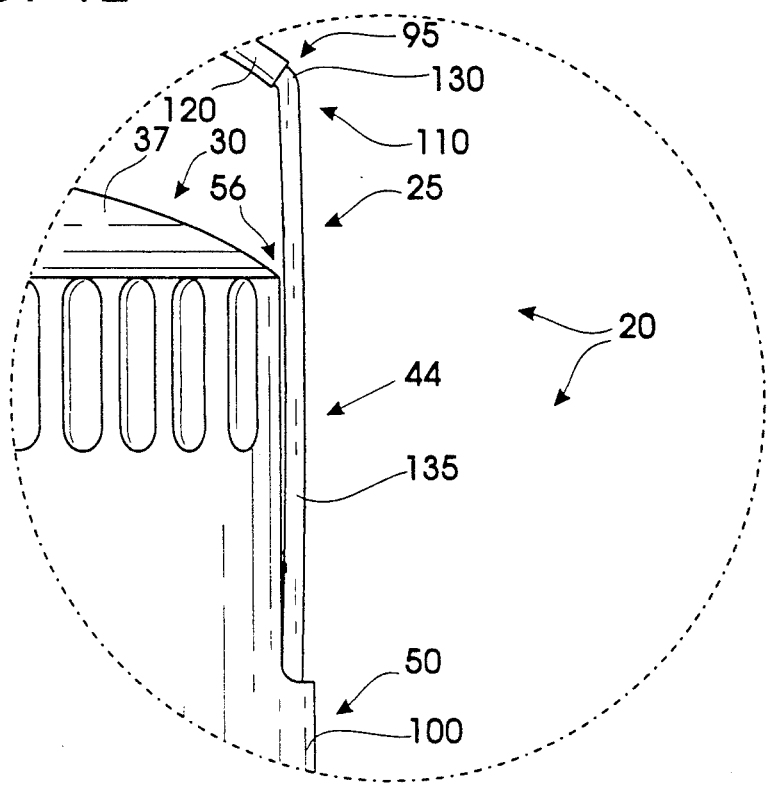

In operation, the handle 35 of the filter 20 may be deployed by grasping the grip 45 and pulling it away from the top 37 of the filter 20. The handle 35 will halt when the stops 55 reach the sleeve 50. The arc 65 (FIG. 12) in the lower portion 90, 140 of the leg 40 will frictionally contact the interior of the sleeve 50 to snappingly retain the handle 35 in the extended position. The handle 35 may be retracted by pushing it toward the top 37 of the filter 20. Once the handle 45 is fully retracted the upper portion 80, 130 of the leg 40 will wedge in the sleeve 50 as the arc 56 frictionally contacts the interior of the sleeve 50, insuring that the handle 35 is semi-permanently maintained in the retracted position.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A spin-on filter comprising:
   a generally tubular body comprising a sidewall, a closed top at one end and a threaded aperture at the other end;
   a fluid flow path through said filter body;
   a filter element interposed within said flow path for filtering a fluid;
   a retractable, external handle associated with said filter than can be manually gripped and twisted for filter installation and removal, said handle comprising:
      a pair of spaced apart, elongated legs slidably coupled to said body at opposite sides thereof; and,
      an integral grip extending between said legs for grasping by a user, said grip nested against said top when said handle is retracted; and,
      a pair of elongated, sleeve means for frictionally captivating said legs for slidable movement relative thereto, said sleeve means radially spaced apart exteriorly upon the sidewall of said body.

2. The filter as defined in claim 1 including stop means on said legs for limiting displacement of said handle by contacting said sleeve means.

3. The filter as defined in claim 1 wherein said grip comprises a resilient, serpentine finger portion adapted to be firmly comfortably grasped by the hand of a user.

4. The filter as defined in claim 1 wherein said legs are arched to frictionally interiorly contact said sleeve means to yieldably maintain said handle in either a semipermanent retracted state or a semipermanent deployed state.

5. A spin on oil filter comprising:
   a generally tubular body having a sidewall, a closed top portion at one end, a threaded aperture at the other end, an oil inlet, and an oil outlet, a fluid flow path established through a filter element disposed within said body between said inlet and said outlet;
   a pair of elongated, tubular, radially spaced apart sleeves integrally formed exteriorly on the sidewall of said body;
   a retractable, external handle that can be manually gripped and twisted for filter installation and removal, said handle comprising:
      a pair of rigid, spaced apart, elongated legs frictionally, slidably captivated within said sleeves;
      a finger receptive, serpentine grip integrally extending between said legs for firm, comfortable grasping by a user; and
      stops on said legs for limiting displacement of said handle.

6. The filter as defined in claim 5 wherein each of said legs are configured to snappingly frictionally interiorly contact said sleeves.

7. The filter as defined in claim 5 wherein said legs are slightly arced to frictionally interiorly contact said sleeves, whereby said handle may be temporarily disposed in either a semipermanent retracted state or a semipermanent deployed state.

8. The filter as defined in claim 7 wherein
   said legs comprise a distal portion having said stops, an integral, proximal portion adjoining said grip, and an integral intermediate portion extending between said distal portion and said proximal portion; and,
   said distal and proximal portions are arced more than said intermediate portion, so that said handle may be relatively easily said between said semipermanent retracted state or said semipermanent deployed state.

9. A spin on oil filter comprising:
   a generally tubular body having a sidewall, a closed top portion at one end and a threaded aperture at the other end, said body establishing a fluid flow path through a filter element within said body;
   a pair of radially spaced apart sheathes exteriorly formed on the sidewall of said body;
   a retractable, external handle that can be manually gripped and twisted for filter installation and removal, said handle comprising:
      a pair of flat, spaced-apart, elongated legs frictionally, slidably captivated within said sheathes;
      a flat, low-profile grip integral with said legs for grasping by a user, said grip flushly nested against said body when said handle is retracted; and, stops on said legs for limiting displacement of said handle.

10. The filter as defined in claim 9 wherein each of said legs are snappingly configured to frictionally interiorly contact said sheathes.

11. The filter as defined in claim 9 wherein said legs are slightly arced to frictionally interiorly contact said sheathes, whereby said handle may be temporarily disposed in either a semipermanent retracted state or a semipermanent deployed state.

12. The filter as defined in claim 1 wherein:

said legs comprise a distal portion having said stops, an integral, proximal portion adjoining said grip, and an integral intermediate portion extending between said distal portion and said proximal portion; and, said distal and proximal portions are arced more than said intermediate portion, so that said handle may be relatively easily slid between said semipermanent retracted state or said semipermanent deployed state.

* * * * *